US012577127B2

(12) United States Patent
Han et al.

(10) Patent No.: US 12,577,127 B2
(45) Date of Patent: Mar. 17, 2026

(54) PROCESS FOR THE MANUFACTURE OF A CATHODE ACTIVE MATERIAL

(71) Applicant: BASF SE, Ludwigshafen am Rhein (DE)

(72) Inventors: Zhenji Han, Amagaski (JP); Jumpei Nakayama, Yamaguchi (JP); Junji Kashiwagi, Yamaguchi (JP); Hitoshi Fukumitsu, Suita (JP); Frank Rauscher, Ludwigshafen (DE); Christoph Erk, Ludwigshafen (DE); Thomas Letzelter, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 458 days.

(21) Appl. No.: 18/247,275

(22) PCT Filed: Sep. 16, 2021

(86) PCT No.: PCT/EP2021/075440
§ 371 (c)(1),
(2) Date: Mar. 30, 2023

(87) PCT Pub. No.: WO2022/069237
PCT Pub. Date: Apr. 7, 2022

(65) Prior Publication Data
US 2023/0406723 A1     Dec. 21, 2023

(30) Foreign Application Priority Data
Oct. 1, 2020    (EP) .................................... 20199673

(51) Int. Cl.
| | |
|---|---|
| *C01G 53/50* | (2025.01) |
| *H01M 4/505* | (2010.01) |
| *H01M 4/525* | (2010.01) |
| *H01M 4/02* | (2006.01) |

(52) U.S. Cl.
CPC ........... *C01G 53/50* (2013.01); *H01M 4/505* (2013.01); *H01M 4/525* (2013.01); *C01P 2002/54* (2013.01); *C01P 2006/40* (2013.01); *H01M 2004/028* (2013.01)

(58) Field of Classification Search
CPC ...... C01G 53/50; H01M 4/505; H01M 4/525; H01M 2004/028; H01M 4/131; H01M 4/1391; H01M 10/0525; C01P 2002/54; C01P 2006/40; C01P 2002/50; C01P 2004/51; C01P 2004/61; C01P 2006/80; C01P 2006/82; Y02E 60/10
See application file for complete search history.

(56) References Cited

U.S. PATENT DOCUMENTS

| | | | |
|---|---|---|---|
| 8,993,051 B2 | 3/2015 | Kelder et al. | |
| 2015/0372300 A1 | 12/2015 | Imaizumi et al. | |
| 2018/0248186 A1 | 8/2018 | Oshita et al. | |
| 2020/0144617 A1* | 5/2020 | Kern ...................... | C01G 53/42 |
| 2020/0161652 A1* | 5/2020 | Erk ........................ | H01M 4/525 |
| 2020/0251733 A1* | 8/2020 | Takano ................. | H01M 4/505 |
| 2021/0376318 A1* | 12/2021 | Erk ........................ | C01G 53/42 |
| 2022/0320496 A1* | 10/2022 | Han ...................... | H01M 4/505 |

FOREIGN PATENT DOCUMENTS

| | | | | |
|---|---|---|---|---|
| CN | 110282665 A | 9/2019 | | |
| JP | 2009099461 A | 5/2009 | | |
| JP | 4789066 B2 | 10/2011 | | |
| WO | WO-2020002024 A1 * | 1/2020 | ............. | C01G 53/42 |
| WO | 2020069886 A1 | 4/2020 | | |

OTHER PUBLICATIONS

International Search Report and Written Opinion for corresponding PCT/EP2021/075440 mailed Jan. 4, 2022; 10 pages.
Extended European Search Report for European Patent Application No. 20199673.3, issued on Mar. 23, 2021, 3 pages.

* cited by examiner

*Primary Examiner* — Mark Kopec
*Assistant Examiner* — Jaison P Thomas
(74) *Attorney, Agent, or Firm* — Armstrong Teasdale LLP

(57)     ABSTRACT

Described herein is a process for manufacture of a cathode active material including the steps of
(a) providing a particulate electrode active material according to general formula $Li_{1+x}TM_{1-x}O_2$, where TM is Ni and, optionally, at least one element selected from the group consisting of Al, Mg, Ba, and transition metals other than Ni, and x is in a range of from −0.05 to 0.2, and where at least 50 mole-% of TM is Ni,
(b) adding an aqueous medium that includes LiOH in dissolved form to the particulate electrode active material provided in step (a),
(c) removing the liquid phase by a solid-liquid separation method, and
(d) at least partially recycling the liquid phase from step (c) for use in a treatment step.

8 Claims, No Drawings

PROCESS FOR THE MANUFACTURE OF A CATHODE ACTIVE MATERIAL

CROSS-REFERENCE TO RELATED APPLICATIONS

This application is a U.S. National Phase Application of PCT/EP2021/075440, filed Sep. 16, 2021, which claims the benefit of priority to European Patent Application No. 20199673.3, filed Oct. 1, 2020, the entire contents of which are hereby incorporated by reference herein.

The present invention is directed towards a process for the manufacture of a cathode active material comprising the steps of (a) providing a particulate electrode active material according to general formula $Li_{1+x}TM_{1-x}O_2$, wherein TM is Ni and, optionally, at least one element selected from Al, Mg, Ba, and transition metals other than Ni, and x is in the range of from −0.02 to 0.2, wherein at least 50 mole-% of TM is Ni, (b) adding an aqueous medium that contains LiOH in dissolved form to the particulate electrode active material provided in step (a), and (c) removing the liquid phase by a solid-liquid separation method, and (d) at least partially recycling the liquid phase from step (c) for a treatment step in analogy to step (b).

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. In most cases, deionized water is used, for example with an electric conductivity of 10 μS/cm or less. However, in several instances it was observed that the properties of the resultant electrode active materials did not improve or even deteriorated. Washing cathode active materials with large amounts of water may deteriorate the performance in an electrochemical cell, for example by causing a high initial resistance. Washing with small amounts of water may increase slurry viscosity and decreased slurry fluidity and is disadvantageous from a productivity perspective.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process". The inventive process includes a treatment of an electrode active material wherein the water used for washing contains LiOH. The inventive process comprises the steps (a), (b), (c) and (d). Steps (b) and (c) may be performed simultaneously or consecutively. The inventive process will be explained in more detail below.

The inventive process comprises the steps of (a) providing a particulate electrode active material— hereinafter also referred to as "starting material"— according to general formula $Li_{1+x}TM_{1-x}O_2$, wherein TM is Ni and, optionally, at least one element selected from Al, Mg, Ba, and transition metals other than Ni, and x is in the range of from −0.02 to 0.2, wherein at least 50 mole-% of TM is Ni, preferably at least 50 mole-% of the transition metal of TM, more preferably at least 60 mole-%, even more preferably at least 75 mole-% and yet even more preferably 85 to 95 mole-%.

(b) adding an aqueous medium that contains LiOH in dissolved form to the particulate electrode active material provided in step (a), and (c) removing the liquid phase by a solid-liquid separation method, and (d) at least partially recycling the liquid phase from step (c) for a treatment step in analogy to step (b).

In a preferred embodiment, TM contains at least one of Co and Mn.

In one embodiment of the present invention the starting material has an average particle diameter (D50) in the range of from 3 to 20 μm, preferably from 4 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 1.0 m²/g. The BET surface may be determined by nitrogen adsorption after outgassing of the sample at 200° C. for 30 minutes or more and beyond this accordance with DIN ISO 9277:2010.

In one embodiment of the present invention, the particulate material provided in step (a) has a moisture content in the range of from 20 to 2,000 ppm, determined by Karl-Fischer titration, preferred are 50 to 1,200 ppm.

Some elements are ubiquitous. In the context of the present invention, traces of ubiquitous metals such as sodium, calcium, iron or zinc, as impurities will not be taken into account in the description of the present invention. Traces in this context will mean amounts of 0.05 mol-% or less, referring to the total metal content of the starting material.

In one embodiment of the present invention, the variable TM corresponds to general formula (I)

$$(Ni_aCo_bMn_c)_{1-d}M^1_d \qquad (I)$$

3 with a+b+c=1 and a being in the range of from 0.6 to 0.99, preferably from 0.75 to 0.95, more preferably from 0.85 to 0.95, b being in the range of from zero or 0.01 to 0.2, preferably from 0.025 to 0.2, more preferably from 0.025 to 0.1, c being in the range of from zero to 0.2, preferably from 0.025 to 0.2, more preferably from 0.05 to 0.1, d being in the range of from zero to 0.1, preferably from zero to 0.04, $M^1$ is at least one of Al, Mg, Ti, Nb, Mo, W and Zr, preferably at least one of Al, Ti, Nb, Zr and W.

In one embodiment of the present invention, the variable c is zero, $M^1$ is Al, and d is in the range of from 0.01 to 0.05.

In another embodiment of the present invention, the variable TM corresponds to general formula (Ia)

$$(Ni_{a*}Co_{b*}Al_{e*})_{1-d*}M^2_{d*} \qquad (Ia)$$

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Nb, Ti or Zr.

The variable x is in the range of from −0.05 to 0.2.

In one embodiment of the present invention TM corresponds to general formula (I) and x is in the range from zero to 0.2, preferably from zero to 0.1 and even more preferably 0.01 to 0.05.

In one embodiment of the present invention TM corresponds to general formula (Ia) and x is in the range of from −0.05 to zero.

In one embodiment of the present invention, TM is selected from $Ni_{0.6}Co_{0.2}Mn_{0.2}$, $Ni_{0.7}Co_{0.2}Mn_{0.1}$, $Ni_{0.8}Co_{0.1}Mn_{0.1}$, $Ni_{0.83}Co_{0.12}Mn_{0.05}$, $Ni_{0.87}Co_{0.05}Mn_{0.08}$, $Ni_{0.88}Co_{0.06}Mn_{0.06}$, $Ni_{0.89}Co_{0.055}Al_{0.055}$, $Ni_{0.9}Mn_{0.1}$, $Ni_{0.91}Co_{0.045}Al_{0.045}$ and $Ni_{0.85}Co_{0.1}Mn_{0.05}$.

The electrode active material provided in step (a) is usually free from conductive carbon, that means that the conductive carbon content of starting material is less than 1% by weight, referring to said starting material, preferably 0.001 to 1.0% by weight.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material.

In step (b), an aqueous medium that contains LiOH in dissolved form is added—which means it is added to the particulate electrode active material provided in step (a). Such LiOH may be added in the form of amorphous solutions or crystalline LiOH and dissolved to a point where—by visual inspection—said aqueous medium looks like a clear solution. In another embodiment, LiOH may be added by using a filtrate of step (c) of an earlier cycle, see below, in whole or in part.

In one embodiment of the present invention, the aqueous medium added in step (b) has an electric conductivity in the range of from 0.8 to 80 mS/cm, determined at ambient temperature (25° C.), preferably 2 to 30 mS/cm.

In one embodiment of the present invention, the aqueous medium added in step (b) has a concentration of lithium in the range of from 20 to 3,500 ppm, preferably from 100 ppm to 2,000 ppm. Said ppm are part per million and refer to ppm by weight.

In one embodiment of the present invention, the aqueous medium added in step (b) is essentially free from compounds of Sb, Mg, Zn, Sn, and Te. In this context, essentially free means that the aqueous medium in step (b) contains less than 0.01% by weight of each the Sb, Mg, Zn, Sn, and Te upon addition.

Said aqueous medium may have a pH value in the range of from 10 up to 14, preferably at least 11. The pH value is measured at the beginning of step (b). It is observed that in the course of step (b), the pH value raises to at least 10, for example 11 to 13. In embodiments wherein the pH value is in the range of from 10 to 11 at the beginning of step (b) it raises to more than 11 to up to 13. In embodiments wherein the pH value is in the range of 3 to below 10 at the beginning of step (b) it raises to 11 to up to 13 in the course of step (b).

It is preferred that the water hardness of said aqueous formulation used in step (b) is at least partially removed, especially calcium and magnesium. Preferably, de-ionized water is used for making the solution that contains LiOH in dissolved form.

In one embodiment of the present invention, step (b) is performed at a temperature in the range of from 5 to 45° C., preferred are 10 to 30° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, in step (b), the amounts of water and electrode active material have a weight ratio in the range of from 1:3 to 5:1, preferably from 1:2 to 2:1.

Step (b) may be supported by mixing operations, for example shaking or in particular by stirring or shearing, see below.

In one embodiment of the present invention, step (b) has a duration in the range of from 1 minute to 90 minutes, preferably 1 minute to less than 60 minutes. A duration of 5 minutes or more is possible in embodiments wherein in step (b), water treatment and water removal are performed overlapping or simultaneously.

In one embodiment of the present invention, treatment according to step (b) and water removal according to step (c) are performed consecutively.

After or during the treatment with an aqueous medium in accordance to step (b), water may be removed by any type of filtration, for example on a band filter or in a filter press.

In one embodiment of the present invention, at the latest 3 minutes after commencement of step (b), step (c) is started. Step (c) includes partially removing the water from treated particulate material, for example by way of a solid-liquid separation, for example by decanting or preferably by filtration. Said "partial removal" may also be referred to as partially separating off.

In one embodiment of step (c), the slurry obtained in step (b) is discharged directly into a centrifuge, for example a decanter centrifuge or a filter centrifuge, or on a filter device, for example a suction filter or in a filter press or in a belt filter that is located preferably directly below the vessel in which step (b) is performed. Then, filtration is commenced.

In a particularly preferred embodiment of the present invention, steps (b) and (c) are performed in a filter press or a filter device with stirrer, for example a pressure filter with stirrer or a suction filter with stirrer. At most 3 minutes after—or even immediately after—having combined starting material and aqueous medium in accordance with step (b), removal of aqueous medium is commenced by starting the filtration. On laboratory scale, steps (b) and (c) may be performed on a Büchner funnel, and steps (b) and (c) may be supported by manual stirring.

In a preferred embodiment, step (b) is performed in a filter device, for example a stirred filter device that allows stirring of the slurry in the filter or of the filter cake.

In one embodiment of the present invention, the water removal in accordance to step (c) has a duration in the range of from 1 minute to 1 hour.

In one embodiment of the present invention, stirring in step (b)—and (c), if applicable—is performed with a rate in the range of from 1 to 50 revolutions per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

From step (c), a residue is obtained, preferably, in the form of a wet filter cake. The moisture content of the filter cake may be in the range of from 2 to 20% by weight, preferably 3 to 9% by weight.

If—for drying purposes—air or an inert gas is blown through the solid residue—it is preferred that such air or inert gas, respectively, has a reduced $CO_2$ content as well.

In addition, from step (c), a liquid phase is obtained, for example a filtrate. Said liquid phase contains lithium compounds, especially lithium hydroxide, in dissolved form.

Step (d) includes at least partially recycling the liquid phase from step (c) for a treatment step in analogy to step (b).

In one embodiment of the present invention the aqueous medium obtained in step (c) is at least partially recycled. For example, the aqueous medium added in step (b) is obtained by diluting liquid phase removed in step (c)—in whole or in part—with water and re-using said filtrate for treatment of an untreated particulate electrode active material. For example, the aqueous medium added in step (b) is obtained by adding some of the liquid phase removed in step (c) with water and using it for a step (b) in a next batch. In other examples, the aqueous medium added in step (b) is obtained by adding the entire liquid phase removed in step (c) with water and using it for a step (b) in a next batch.

Preferably, step (c) is performed as a filtration, and some of the filtrate, for example 5 to 75% by volume, is recycled by adding water and using it for a step (b) in a next batch.

Optionally, the inventive process may comprise a subsequent step (e):

(e) treating the solid residue from step (c) thermally.

In this context, the term "subsequent" means that step (e) may be carried out after step (c) but independently of step (d).

Step (e) may be carried out in any type of oven, for example a roller hearth kiln, a pusher kiln, a rotary kiln, a pendulum kiln, or—or lab scale trials—in a muffle oven.

The temperature of the thermal treatment according to step (e) may be in the range of from 200 to 900° C., preferably 250 to 600° C. and even more preferably from 275 to 550° C. Said temperature refers to the maximum temperature of step (e).

It is possible to subject the material obtained from step (d) directly to step (e). However, it is preferred to increase the temperature stepwise, or to ramp up the temperature, or to dry the material obtained after step (d) at first at a temperature in the range of from 40 to 185° C. before subjecting it to step (e), or to remove water by a solid-liquid separation method such as filtration.

Said step-wise increase or ramping up may be performed under normal pressure or reduced pressure, for example 0.1 to 500 mbar.

Step (e)—at its maximum temperature—may be performed under normal pressure.

In one embodiment of the present invention, step (e) is carried out under an oxygen-containing atmosphere, for example air, oxygen-enriched air or pure oxygen.

In embodiments wherein a drying at a temperature in the range of from 100 to 250° C. prior to step (e) is performed such drying may be performed with a duration of from 10 minutes to 5 hours.

In one embodiment of the present invention, step (e) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (e) under an atmosphere with a carbon dioxide content below detection limit for example with infrared-light based optical methods.

In one embodiment of the present invention step (e) has a duration in the range of from 1 to 10 hours, preferably 90 minutes to 6 hours.

In one embodiment of the present invention, the lithium content of an electrode active material is reduced by 0.04 to 0.5% by weight, preferably 0.05 to 0.3%, referring to the lithium content of said electrode active material. Said reduction mainly affects the so-called residual lithium. The so-called residual lithium may be determined by extraction and titration, for example with 1 M HCl.

Without wishing to be bound by any theory, we assume that the surface of the electrode active material is less negatively influenced by the inventive process than by washing processes without LiOH addition. It may be assumed that the quick extraction of lithium compounds in processes that employ pure water may do more structural damage to the electrode active material than a potentially slower reaction in accordance with the instant claims.

One or more additional—optional—steps (f) may be performed between step (c) and step (e) or after step (e), for example a coating step, a boric acid treatment step, or a coating using an aqueous formulation of at least one of Al, Sb, Te, a heteropoly acid, in slurried or dissolved form.

Electrode active materials treated by the inventive process display an excellent behavior with respect to gassing, cycle stability, specific capacity and a reduced tendency of gelling during cathode manufacture. In addition, the inventive process allows to increase the space velocity of the filter device and to reduce the production of waste water containing lithium salt.

The present invention is further illustrated by the following working examples.

General remarks: N-methyl-2-pyrrolidone: NMP.

De-ionized water has a conductivity of 5 μS/cm at 23° C.

Ultra-dry air: dehumidified air, dew point of less than −30° C., and $CO_2$ content less than 50 ppm Conductivities were measured at 25° C.

I. Synthesis of a Cathode Active Material

I.1 Synthesis of a Precursor TM-OH.1

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn at a molar ratio of 8.7:0:5:0.6 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) hydroxide precursor TM-OH.1 was obtained by filtration of the resulting suspension, washing with distilled water, drying at 120° C. in air and sieving.

I.2 Conversion of TM-OH.1 into Cathode Active Materials

I.2.1 Manufacture of a Base Cathode Active Material, B-CAM.1, Step (a.1)

B-CAM.1 (base): The mixed transition metal hydroxide precursor TM-OH.1 was mixed with $Al_2O_3$ (average particle diameter 6 nm) to obtain a concentration of 2 mole-% Al relative to Ni+Co+Mn+Al and LiOH monohydrate to obtain a Li/(TM+Al) molar ratio of 1.03. The mixture was heated to 760° C. and kept for 10 hours in a forced flow of a mixture of 80% oxygen and 20% nitrogen (by volume). After cooling to ambient temperature the powder was deagglomerated and sieved through a 32 μm mesh to obtain the base cathode active material B-CAM 1.

D50=14.0 μm determined using the technique of laser diffraction in a Mastersize 3000 instrument from Malvern Instruments. The Al-content was determined by ICP analytics and corresponded to 780 ppm. Residual moisture at 250° C. was determined to be 300 ppm.

I.2.2 Manufacture of a Comparative Cathode Active Material, Steps C-(b.1) to (e.1)

Step C-(b.1): A beaker was charged with 10 ml of de-ionized water, conductivity below 5 μS/cm. An amount of 100 g B-CAM.1 was added. The resultant slurry was stirred at ambient temperature over a period of 60 minutes, during said stirring the slurry temperature was maintained at 25° C.

Step C-(c.1): Then, the water was removed by filtration through a filter press. A wet filter cake remained.

Step (e.1): The resultant filter cake was dried in ultra-dry air at 70° C. for 2 hours and then at 120° C. over a period of 10 hours. Then, by sieving obtained powder with 45 μm sieve, cathode active material C-CAM.1 was obtained.

1.2.3 Synthesis of Inventive Cathode Active Materials, Example of CAM.2

Step (a.2) was performed as above.

Step (b.2): Filtrate from step C-(c.1) was diluted with de-ionized water in a weight ratio of 1:9. The electric conductivity was 8.3 mS/cm. A beaker was charged with 67 ml of the resultant clear solution, and 100 g of B-CAM.1 were added. The resultant slurry was stirred at ambient temperature over 60 minutes.

Step (c.2): Then, the liquid phase was removed by filtration through a filter press. A wet filter cake remained.

Step (d.2) The filtrate was again diluted with water, weight ratio of 1:9, and used for a treatment step in analogy to step (b.2).

Step (e.2): The resultant filter cake was dried in ultra-dry air at 70° C. for 2 hours and then at 120° C. over a period of 10 hours. Then, by sieving obtained powder with 45 μm sieve, cathode active material CAM.2 was obtained.

I.2.4 Further Experiments

In further experiments, the filtrate obtained in step (c.2) was used for making aqueous formulations, see Table 1.

TABLE 1

| | | | | | Composition of further aqueous formulations | | | | | |
|---|---|---|---|---|---|---|---|---|---|---|
| For step | (b.2) | (b.3) | (b.4) | (b.5) | (b.6) | (b.7) | (b.8) | (b.9) | (b.10) | C-(b.1) |
| $H_2O$ [g] | 90 | 60 | 75 | 82 | 86 | 93 | 95 | 98 | 99 | 100 |
| Filtrate [g] | 10 | 40 | 25 | 18 | 14 | 7 | 5 | 2 | 1 | 0 |
| CM [mS/cm] | 8.1 | 32.2 | 20.1 | 14 | 10.9 | 5.71 | 4.04 | 1.65 | 0.8 | 0 |
| $H_2O$/LiOH aq. (filtrate) | 90/10 | 60/40 | 75/25 | 82/18 | 86/14 | 93/7 | 95/5 | 98/2 | 99/1 | 100/0 |
| Total aq. [g] | 100 | 100 | 100 | 100 | 100 | 100 | 100 | 100 | 100 | 100 |
| c(Li) [ppm] | 257 | 1207 | 712 | 479 | 359 | 174 | 118 | 43 | 20 | zero |

Total aq: total aqueous medium, water plus filtrate c(Li): concentration of lithium (as LiOH) in washing medium II. Testing of Cathode Active Material II.1 Electrode Manufacture, General Procedure Positive electrode: PVDF binder (Solef® 5130) was dissolved in NMP (Merck) to produce a 8.0 wt. % solution. For electrode preparation, binder solution (4 wt. %), and carbon (EIS) method using potentiostat and frequency response analyzer system (Solartron CellTest System 1470E). From the EIS spectra, Ohmic resistance and reactive resistance were obtained. The results are summarized in Table 2.

Results

| | Type [μm] | H₂O/filtrate | CM of H₂O/filtrate [mS/cm] | S/L [g/L] | Filtrate CM [mS/cm] | Δ CM [mS/cm] | Δ Li-dissolution [mg] | Relative resistance [Ω] |
|---|---|---|---|---|---|---|---|---|
| C-CAM.1 | 14 | 100/0 | 0 | 1000 | 46.5 | 46.5 | 182 | 44.6 |
| C-CAM.2 | 4 | 100/0 | 0 | 1000 | 46.5 | 46.5 | 182 | 40.7 |
| C-CAM.3 | 14 | 100/0 | 0 | 1500 | 58.1 | 58.1 | 156 | 32.0 |
| C-CAM.4 | 4 | 100/0 | 0 | 1500 | 58.3 | 58.3 | 156 | 33.4 |
| CAM.1 | 14 | 90/10 | 8.3 | 1500 | 60.3 | 52.0 | 130 | 27.9 |
| CAM.2 | 14 | 93/7 | 6.1 | 1500 | 61.0 | 54.9 | 141 | 30.3 |
| CAM.3 | 4 | 90/10 | 8.4 | 1500 | 56.9 | 48.5 | 121 | 22.8 |
| CAM.4 | 4 | 93/7 | 6.2 | 1500 | 55.3 | 49.1 | 125 | 26.7 |
| CAM.5 | 4 | 95/5 | 3.7 | 1500 | 56.0 | 52.4 | 135 | 27.4 |

CM: conductivity.

S/L: solid/liquid during n.d.: not determined black (Li250, 3.5 wt.-%) were suspended in NMP. After mixing using a planetary centrifugal mixer (ARE-250, Thinky Corp.; Japan), either any of inventive CAM.2 to CAM.7 or a base cathode active material C-CAM.1, (92.5 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 70 μm, corresponding to 15 mg/cm². All electrodes were dried at 120° C. for 7 hours before battery assembly.

II.2 Electrolyte Manufacture

A base electrolyte composition was prepared containing 12.7 wt % of LiPF₆, 26.2 wt % of ethylene carbonate (EC), and 61.1 wt % of ethyl methyl carbonate (EMC) (EL base 1), based on the total weight of EL base 1. To this base electrolyte formulation 2 wt. % of vinylene carbonate (VC) was added (EL base 2).

III Test Cell Manufacture

III.1 Coin-Type Half Cells

Coin-type half cells (20 mm in diameter and 3.2 mm in thickness) comprising a cathode prepared as described under III.1.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (II.2) were introduced into the coin cell.

III.2 Evaluation of Coin Half-Cell Performance

Cell performance were evaluated using the produced coin type battery. For the battery performances, initial capacity and reaction resistance of cell were measured. The initial performance and cycle were measured as follows: Coin half cells according to II.3.1 were tested in a voltage range between 4.3 V to 2.8 V at room temperature. For the initial cycles, the initial lithiation was conducted in the CC-CV mode, i.e., a constant current (CC) of 0.1 C was applied until reaching 0.01 C. After 10 min resting time, reductive lithiation was carried out at constant current of 0.1 C up to 2.8 V. The results are summarized in Table 2.

The cell reaction resistance was calculated by the following method: After the evaluation of the initial performance, the coin cells are recharged to 4.3V, and the resistance is measured by the electrochemical impedance spectroscopy

The invention claimed is:

1. A process for manufacture of a cathode active material comprising the steps of (a) providing a particulate electrode active material according to general formula $Li_{1+x}TM_{1-x}O_2$, wherein TM is Ni and, optionally, at least one element selected from the group consisting of Al, Mg, Ba, and transition metals other than Ni, and x is in a range of from −0.02 to 0.2, and wherein at least 50 mole-% of TM is Ni, (b) adding an aqueous medium that comprises LiOH in dissolved form to the particulate electrode active material provided in step (a), (c) removing the liquid phase by a solid-liquid separation method, and (d) at least partially recycling the liquid phase from step (c) for use in a treatment step.

2. The process according to claim 1, wherein TM is a combination of metals according to general formula (I)

$$(Ni_aCo_bMn_c)_{1-d}M_d \qquad (I)$$

with a being in a range of from 0.6 to 0.99, b being zero or in a range of from 0.01 to 0.2, c being in a range of from zero to 0.2, and d being in a range of from zero to 0.1, M is at least one of Al, Mg, Nb, Ta, Ti, Mo, W and Zr, and a+b+c=1.

3. The process according to claim 1, wherein the solid-liquid separation method in step (c) is a filtration.

4. The process according to claim 1, wherein an electric conductivity of the aqueous medium added in step (b) is in a range of from 0.8 to 80 mS/cm, determined at ambient temperature.

5. The process according to claim 1, wherein a concentration of LiOH of the aqueous medium added in step (b) is in a range of from 20 to 3,500 ppm by weight.

6. The process according to claim 1 further comprising a subsequent step (e):

(e) treating the solid residue from step (c) thermally.

7. The process according to claim 1, wherein the aqueous medium added in step (b) is obtained by diluting the liquid phase removed in step (c) with water and re-using said diluted liquid phase for treatment of an untreated particulate electrode active material.

8. The process according to claim 1, wherein the aqueous medium added in step (b) is essentially free from compounds of Sb, Mg, Zn, Sn, and Te.

\* \* \* \* \*